United States Patent [19]
Kufahl

[11] Patent Number: 6,139,378
[45] Date of Patent: Oct. 31, 2000

[54] DRIVE STRUCTURE AND ASSEMBLY FOR A PONTOON VESSEL

[76] Inventor: Larry I. Kufahl, 1302 N. 26$^{th}$ St., Wausau, Wis. 54403

[21] Appl. No.: 09/149,371

[22] Filed: Sep. 8, 1998

[51] Int. Cl.$^7$ .................................................... B60F 3/00
[52] U.S. Cl. ........................ 440/12.51; 440/12.53; 440/12.54; 440/12.56; 440/12.63
[58] Field of Search ................ 114/43, 61.1, 61.22, 114/283; 440/12.5, 12.51, 12.52, 12.53, 12.54, 12.56, 12.63, 12.64, 12.57

[56] References Cited

U.S. PATENT DOCUMENTS

| | | |
|---|---|---|
| 613,576 | 11/1898 | Kirby ........................................ 114/43 |
| 861,607 | 7/1907 | Pfeifer ...................................... 114/43 |
| 2,950,699 | 8/1960 | Ogden et al. ......................... 114/61.22 |
| 3,180,442 | 4/1965 | Pomeroy .................................. 114/43 |
| 3,593,684 | 7/1971 | Cogliano . |
| 3,646,904 | 3/1972 | Lanning et al. . |
| 3,707,938 | 1/1973 | Olson . |
| 3,797,446 | 3/1974 | Cox et al. . |
| 3,826,216 | 7/1974 | Rhody . |
| 3,921,239 | 11/1975 | Sovia et al. . |
| 4,013,029 | 3/1977 | Rhody . |
| 4,135,470 | 1/1979 | Ono . |
| 4,141,309 | 2/1979 | Holboth . |
| 4,727,820 | 3/1988 | Klaus . |
| 4,801,153 | 1/1989 | Wilson . |
| 5,082,198 | 1/1992 | Patel . |
| 5,522,339 | 6/1996 | Pelly . |
| 5,544,906 | 8/1996 | Clapper . |

*Primary Examiner*—Sherman Basinger
*Attorney, Agent, or Firm*—Andrus, Sceales, Starke & Sawall, LLP

[57] ABSTRACT

A pontoon boat has a deck and laterally spaced supporting pontoons. A drive coupling assembly is secured to the aft end of the deck between the pontoons, and includes a vessel coupling unit. For a water propulsion drive such as an outboard motor, the coupling assembly includes an outboard motor coupling unit complementing that vessel coupling unit, and engagement therewith includes a transom, an outboard motor secured appropriately having a propeller drive for propelling of the vessel. A traction drive unit for ground support include a traction coupling unit complementing the vessel coupling unit. The traction coupling unit replaces the motor drive coupling unit and provides for releasable interconnection of a traction drive unit. A typical coupling assembly would provide for releasable sliding and intercoupling members between the vessel coupling unit and the respective drive units. The traction drive unit includes an engine and an endless traction belt mounted within a supporting framework with the bottom run engaging the supporting surface. A ski unit is releasably secured to the front of the boat and supports the pontoons raised above the supporting surface and also providing for steerage of the vessel when moving over surface such as snow covered land, ice or the like. The ski unit includes a pair of laterally spaced skis interconnected to the opposite sides of the pontoon vessel. The ski would be mounted for pivotal movement for steerage and interconnected to a common steerage control.

6 Claims, 3 Drawing Sheets

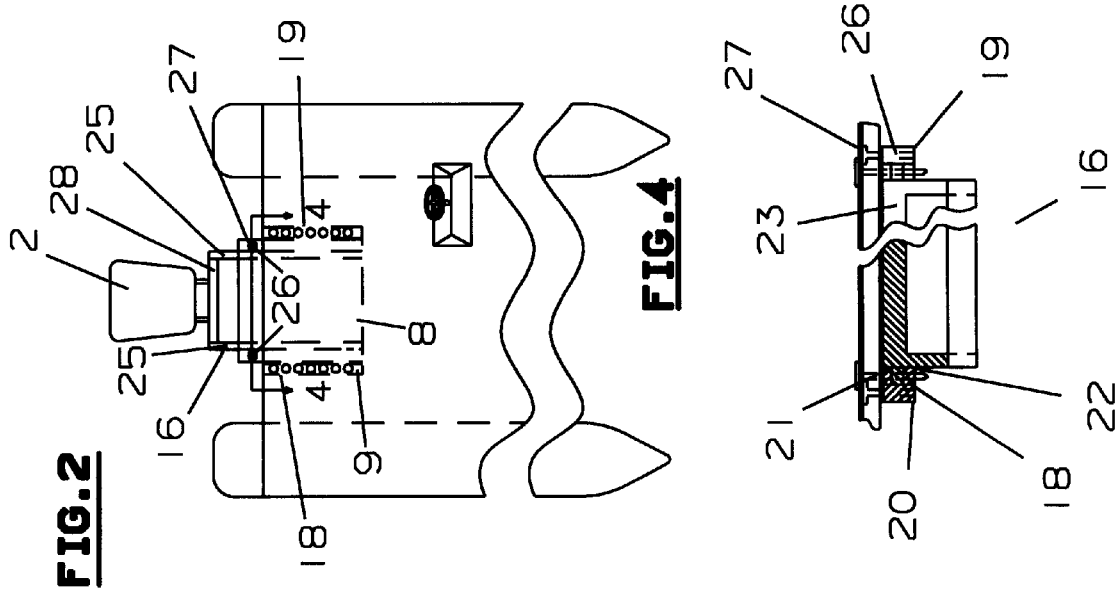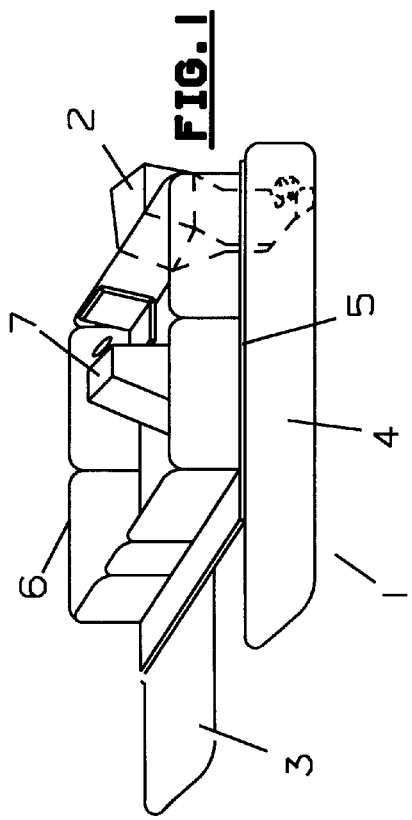

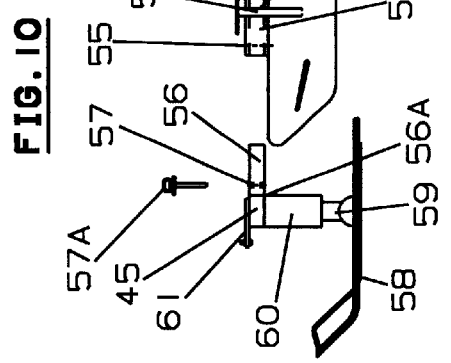
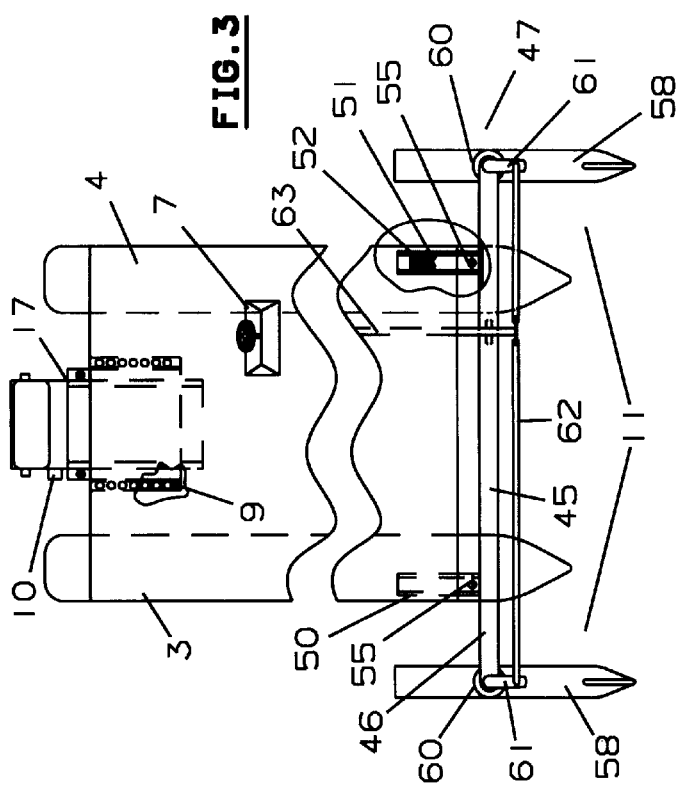
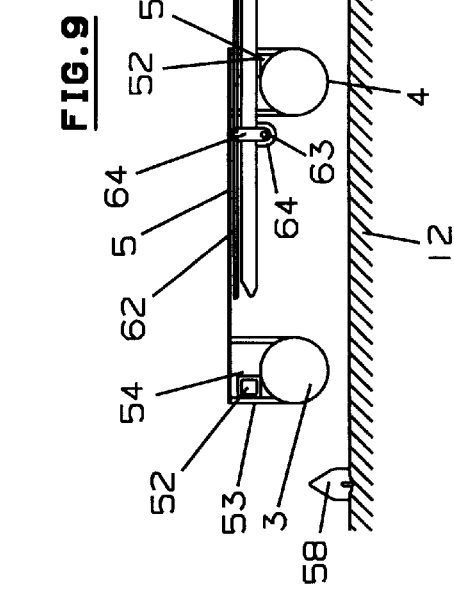

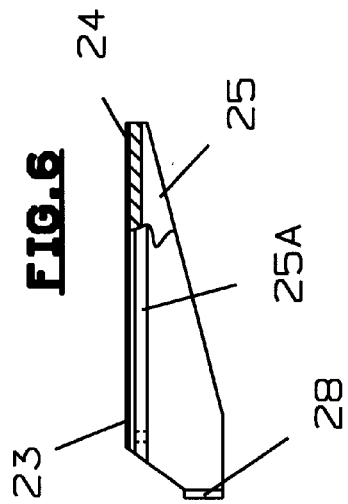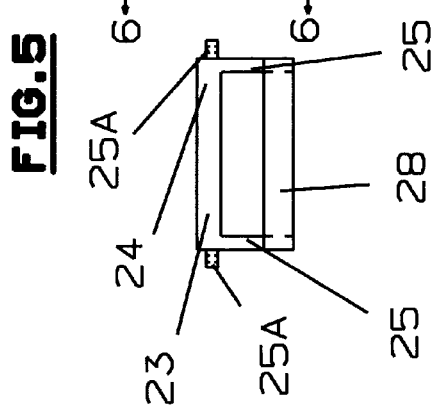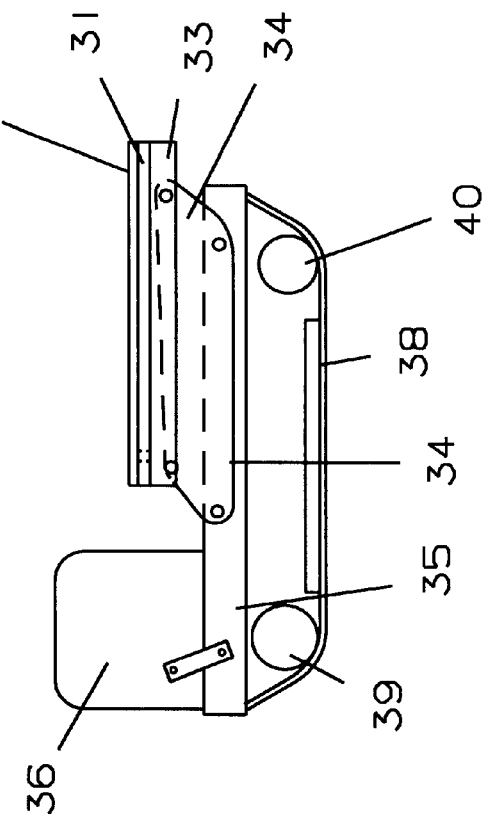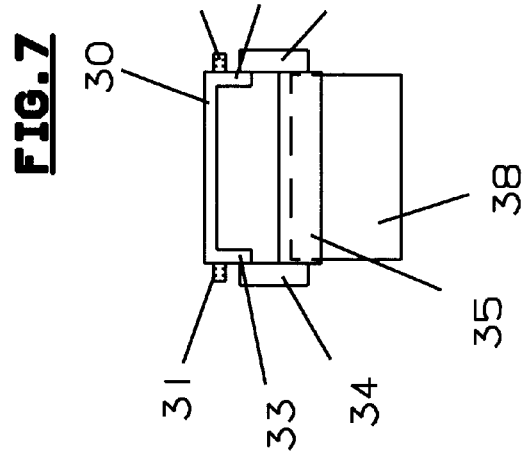

DRIVE STRUCTURE AND ASSEMBLY FOR A PONTOON VESSEL

This invention is particularly directed to a drive structure and system for attachment to a water vessel having pontoons and provide for propulsion of the vessel over a solid supporting undersurface such as the ground, ice and including particularly snow covered ground and ice covered lakes and rivers.

BACKGROUND OF THE INVENTION

The present invention is particularly directed to the structure, system and apparatus for converting of a pontoon-type water vessel for over land propulsion and particularly for over frozen water way propulsion Pontoon boats and like floating vessels are widely manufactured and sold for both personal usage on lakes, rivers and the like as well as for generally commercial and ulitarian purposes. Pontoon boats and similar raft-type water vessels, hereinafter references as pontoon vessels, are generally built for limited speed of movement and are intended for leisure travel by one or groups of individuals during periods that water is not frozen. Thus during inclement winter-like weather when the rivers, lakes and the like are frozen over, the pontoon boats and the like are typically stored for use in warmer conditions.

The pontoon boats are relatively costly devices and if usable whenever the lakes, rivers and the like are frozen or even for use over snow covered land facilities and the like, the value and use of the pontoon boat would be significantly increased. Applicant knows of no other structure or system which provides for such usage of a pontoon boat.

SUMMARY OF THE PRESENT INVENTION

The present invention is particularly directed to the construction of and the converting of a pontoon vessel into a land-type of vehicle for recreational or ulitarian usage and movement over a solid supporting surface, in particular over snow covered land and/or ice, as well as over ice covered waterways directly. Generally in accordance with the present invention the pontoon vessel is constructed with a drive system inclusive of a detachable separate traction drive unit as an integrated part of the vessel to support a forward or aft portion of the vessel above the supporting surface and provide a propulsion force. In addition, the opposite forward or aft portion of the vessel is supported by a support structure as an integrated part of the vessel which raises and supports the portion of the pontoon vessel spaced from the traction drive unit.

Generally, in accordance with one aspect of the present invention a floating pontoon vessel has laterally spaced supporting pontoons extending substantially in parallel fore and aft orientation. A traction drive unit which is adapted to engage a solid or rigid supporting surface is provided and connected through a coupling assembly secured to the vessel for releasable mounting of the drive unit, preferably to an aft portion of the vessel, and between the laterally spaced pontoons. The traction drive unit is such as to raise the lowermost portion of the pontoons above the supporting surface for movement over a solid supporting surface. A spaced portion of the vessel is also provided with a forward support structure, preferably a sliding structure such as a ski assembly and releasably secured to the spaced portion of the pontoon vessel. The forward support structure . . . supports the corresponding portion of the vessel with the pontoons in spaced relation to the solid supporting surface. Both the traction drive unit and the forward support structure are releasably mounted to allow the unobstructed movement of the vessel in a water body. Although the traction drive unit and the forward support structure are preferably releasably and removably attached, such elements can be mounted if required or desired to a raised position with the vessel within a body of water.

More particularly in a preferred construction, the pontoon vessel has laterally spaced supporting pontoons. A drive support and coupling assembly or structure is secured to the aft end of the vessel deck between the pontoons, and includes a releasable vessel coupling unit. For a water propulsion drive such as an outboard motor the coupling structure includes a motor coupling unit complementing that vessel coupling unit and provides for releasable interengagement therewith. The motor coupling unit for an outboard motor would include a transom configured to have an outboard motor secured appropriately depending downwardly into the water aft of the vessel for propelling of the vessel. The traction drive unit would in turn include a traction coupling unit complementing that of the vessel coupling unit and provide for releasable interconnection of the traction drive unit in place of the coupling unit of the outboard motor or other water propulsion unit. The traction drive unit may be of any desirable construction adapted to support the vessel and simultaneously provide for movement over a rigid or solid supporting surface.

A typical coupling assembly would provide for releasable sliding intercoupling members between the vessel unit and the respective drive units. A typical coupling assembly for example could employ simple linear slide members including laterally spaced and permanently mounted slide member on the vessel and cooperating and complimenting slide members on the coupling units for the respective traction drive unit and the motor mount unit. The coupling assembly would be constructed to locate the elements in appropriate relation to the vessel for the necessary propulsion. The traction drive unit in a preferred construction would include a structure generally well known in connection with snowmobiles and the like with an endless traction belt mounted within a supporting framework including the traction drive coupling unit and with the bottom run engaging the supporting surface, and thereby providing for propulsion of the drive unit and the interconnected pontoon vessel. Thus a suitable gasoline driven engine can be readily mounted to the traction drive unit to provide for the drive and movement of the vessel, all generally in accordance with a typical snowmobile drive system. One possible construction is disclosed in detail in connection with the illustrated embodiments.

To support the forward portion of the pontoon vessel a ski arrangement would be releasably secured to the forward end of the vessel and support the pontoons raised above the supporting surface and also providing for steerage of the vessel when moving over surface such as snow covered land, ice or the like. In a preferred construction the forward support structure could include a pair of laterally spaced ski units interconnected to the opposite sides of the pontoon vessel. The ski unit would be mounted for pivotal movement for steerage and interconnected to a common steerage control. The skis could preferably be constructed with damping support such as shock absorbers or the like.

The present invention thus provides a pontoon vessel such as the well known recreational which has conventional usage for a recreation as well as utility both on water or land bodies.

Although contemplated as primarily providing for application to house boats for recreational cruising vessel, the invention may be extended to any other type of a pontoon vessel and used for any other purpose such as transport of goods and or the like.

The traction driven vessel would be particularly useful in servicing of things and personnel on the ice covered water. The device could thus be practically used as an emergency vehicle for servicing of or attending to people who have broken through the ice either directly or in the event of use of some other vehicle. In addition, it would provide a highly useful and safe emergency vehicle for use on ice covered rivers and lakes, where for any reason the ice is sufficiently frozen to support other users such as snow-mobilers, ice fishing equipment and personal and breaks under the weight of such various devices personnel. Although the ice could also break under the weight of the pontoon vessel constructed in accordance with the present invention, such vessel would maintain its floatability and allow the continuous or safe support of the vehicle and the individuals thereon.

Various other features, objects and advantages of the invention will be made apparent from the following description taken together with the drawings.

BRIEF DESCRIPTION OF THE DRAWINGS

The drawings furnished herewith illustrate a typical and preferred construction of an embodiment of the invention.

In the drawings:

FIG. 1 illustrates a embodiment of the invention applied to a pontoon boat of a typical construction for recreational purposes and shown including an outboard motor drive;

FIG. 2 is a plan view of the aft portion of the pontoon boat as shown in FIG. 1;

FIG. 3 is a plan view illustrating the pontoon boat constructed with a traction drive unit in place of the outboard motor drive unit of FIGS. 1 and 2 for transport over a land surface such as ice, snow covered ground and the like;

FIG. 4 is a fragmentary sectional view taken on a vertical plane through the aft end of FIG. 2 on line 4—4 and showing the coupling assembly for attachment of outboard motor as shown in FIG. 1 and removed in FIG. 4;

FIG. 5 is a separate end view of the motor coupling unit;

FIG. 6 is a side view taken generally on Line 6—6 of FIG. 5;

FIG. 7 is an view of the traction drive coupling unit for interconnection of a traction drive unit to the pontoon boat as shown in FIG. 3;

FIG. 8 is a side elevational view of the drive unit as shown in FIG. 7 with the traction drive in place;

FIG. 9 is an end view of the forward end of the pontoon boat illustrating the forward support structure as shown in FIG. 3; and FIG. 10 is an exploded side view of the structure shown in FIGS. 8 and 9, with parts broken away and sectioned.

DETAILED DESCRIPTION OF THE INVENTION

Referring to the drawings and particularly to FIG. 1, a pontoon vessel 1 of a known construction is illustrated including an outboard motor 2 as a drive unit mounted the aft end of the vessel. The pontoon vessel includes laterally spaced starboard and port side pontoons 3 and 4. A connecting deck or other support structure 5 is interconnected to the top side of the pontoons and defines a floating vessel adapted to be propelled across the body of water, not shown.

The illustrated unit includes encircling rails 6 about the outer periphery of the deck with a central steering and drive control center 7 located generally in a central portion of the deck. The outboard motor 2 is secured to the aft end of the deck through a special coupling unit or assembly 8 for releasably mounting of the outboard motor in place. The coupling assembly 8 includes a vessel mount unit 9 releasably secured to the deck to which the outboard motor is releasably mounted (FIG. 1) or in the alternative a ground engaging traction drive unit 10 as more fully developed hereinafter (FIG. 3).

Referring to FIG. 3, the separate traction drive unit 10 is adapted to be located beneath the aft end of the vessel deck 5 and interconnected through the coupling assembly 8 to the vessel deck. A slide and steering assembly 11 is releasably secured to the forward end of the deck 5 and/or pontoons 3 and 4. The traction drive unit 10 and the slide unit 11 support the vessel with the pontoon 3 and 4 spaced upwardly from a slide supporting undersurface 12 (FIG. 9), such as ground, ice, snow or the like. The system has an additional advantage when the vessel is used on ice. If it should break through the ice for any reason, the vessel will be supported on the water by the pontoon structure. The present invention thus provides for continued use of a pontoon vessel in northern environments, both in the periods when there is free water when the water is frozen and other surfaces are covered by an adequate layer of supporting snow.

The releasable coupling assembly 8 may take any suitable construction. As most clearly shown in FIGS. 2–6 the illustrated assembly 8 includes the vessel mount or coupling unit 9 adapted to releasably receive the outboard coupling unit 16 (FIG. 2) or a traction coupling unit 17 (FIG. 3) for a respective releasable attachment of the outboard motor or the traction drive unit 10.

Referring particularly to FIGS. 2–6, the vessel coupling unit 9 is shown consisting of the pair of laterally spaced slide members 18 and 19 rigidly and affixedly secured to the underside of the deck 5 in any suitable manner, such as bolting, welding or the like. In the illustrated embodiment of the invention, each member 18 and 19 is a generally flat member. Referring particularly to member 18, the member includes a mounting portion 20 bolted to the deck. An inwardly extending portion 21 includes a U-shaped opening 22 extending laterally across the deck. Referring to FIGS. 4–6, the outboard motor coupling unit 16 includes a spaced generally U-shaped transom adapter 23 including a top wall plate 24 with depending side walls 25. The top plate 24 includes outwardly extended mounting flanges 25A adapted to mate with the U-shaped opening 22 of the members 18 and 19 of the coupling assembly 8. The coupling units 9 and 16 and flanges 25A have aligned openings, 26 and with the unit in proper orientation, receives attachment pins 27, at least two of which are required, one for each side of the coupling assembly 8. In all mounted positions of the transom adapter 23, the side wall 25 are located rearwardly of the deck. A transom mounting plate 28 is located in outwardly spaced relation by an extension of the arms 25, as shown in FIGS. 2 and 6. The transom plate 28 is adapted to receive the conventional releasable coupling of an outboard motor. In this arrangement, the outboard motor 2 is releasably mounted to the coupling assembly 8 for conventional propulsion of the water vessel through a body of water.

To convert to an ice, land or other hard surface support, the outboard motor 2 is removed, the adapter 23 is released from the deck 5 and replaced by the traction drive coupling unit 17. As more clearly shown in FIGS. 3, 7 and 8. The traction coupling unit 17 includes an upper mounting plate 30 including laterally extending mounting flanges 31 for mounting of the unit in the deck coupling members 18 and 19 in the same manner as that of the transom adapter 23. The plate 30 is a U-shaped unit which includes side walls 32 and 33 and which depend downwardly for a short distance below the deck 5, the side walls are spaced to receive the traction drive unit 10. The unit 17 is attached to the traction drive unit 10 by pivot arms 34 secured to the opposite side walls 32 and 33 and to a support structure 35 of the traction drive unit 16. Two pivot arms 34 are secured to each side of the aft and forward end of the mounting plate 30 and structure 35.

The support structure 35 is a flat bed-like unit or platform with any suitable construction. It forms a rigid frame structure for supporting of the engine 36 and the connections to drive coupling unit 17, and projects rearwardly or aft thereof. The extended portion supports a suitable internal combustion engine 36, shown in block diagram in FIGS. 3 and 8. Engine 36 is secured to the platform 35 by a suitable pivot arms or bracket 37 on each side of the platform 35. The output of the engine is coupled to an endless track, shown as a flat belt member 38. The flat endless belt member 38 is supported by laterally spaced drive wheels or sprockets 39 located beneath the engine. Similar wheels or sprockets 40 are similarly secured at the forward end of the platform and support the forward end of belt member 38. The upper run, not shown, of the endless belt 38 is supported by a suitable guide or plurality of similar sprocket wheels.

The engine is coupled to drive the sprocket wheels 39 and thereby the endless belt in a continuous motion. In the illustrated embodiment of the invention as shown in FIG. 8, the clockwise drive of the belt will propel the traction unit 10 in a forward direction and correspondingly the intercoupled water vessel 1 when supported on suitable ground, ice, snow or the like.

The forward or front steering assembly 11 as shown in FIGS. 3, 9 and 10 is releasably secured to the forward end of the vessel, with the ski assembly 11 supporting the forward end of the vessel in a raised position above the underlying supporting surface 12. With the pontoons 3 and 4 totally raised from the ground engagement, a substantially smooth motion over the surface is obtained as well as permitting turning of the vessel in that mode of movement.

The illustrated support and steering assembly 11 includes a rigid cross beam 45 for mounting to the vessel. Corresponding ski unit 46 and 47 are similarly interconnected to the opposite ends of beam 45 and located outwardly of the pontoons 3 and 4, as shown in FIGS. 8 and 9. The beam 45 is releasably attached to the vessel by spaced coupling assemblies 50 and 51, as clearly shown in FIGS. 3, 9 and 10. Each illustrated coupling assembly 50 and 51 is one possible construction and any suitable supporting structure, with or without but preferably with steering capability, is provided in connection with the forward supporting structure attached directly at the decks and/or the pontoons.

In the illustrated embodiment of the invention, the forward support assembly 11 includes the releasable coupling assembly 50 adjacent the pontoon 3 and the similar coupling assembly 51 correspondingly constructed and arranged at the other pontoon 4. The coupling assembly 51 is described in detail. The corresponding elements of a coupling assembly 50 are identified by corresponding primed numbers for simplicity and clarity of explanation.

Referring particularly to FIGS. 3 and 10, the coupling assembly 50 includes a coupling member 52 secured to the deck 5 and pontoon support of the vessel. The coupling member 52 is illustrated as a square, rigid tube opening longitudinally or fore to aft of the vessel. It is secured to the deck 5 and the supporting frame 53 between the deck and the upper surface of the pontoon 4. The tube is shown, for example, suitably supported rigidly in place by welds 53A. Any other form of rigid interconnection may of course be provided. The coupling tube 52 projects slightly forwardly of the deck 5 and is particularly located, as shown most clearly in FIGS. 3 and 9, abutting the frame 53 and located adjacent to the gap or spacement 54 between the top of the pontoon 4 and the frame 53. The tube has a vertical coupling hole 55 generally aligned on the center thereof and thus into alignment with the gap 54 defined by the location relative to the pontoon. The coupling assembly 51 includes a corresponding coupling member 56 affixed to the cross beam 45 of the support assembly. Member 56 is a rigid rod which may be tubular or solid and is rigidly affixed to the cross beam as by a suitable weld 56A or any other means. The coupling tube or member 56 has an aligned vertical opening 57.

The tube 56 has a cross section corresponding to the cross section of the deck attached tube 52. Member 56 is telescoped into member 52 with the openings 55 and 57 aligned. A coupling pin 57a is then introduced to securely interlock the beam 45 to the deck and correspondingly locate the ski assembly to one side and somewhat forwardly at the forward end of the vessel.

The opposite ski unit 46 is correspondingly interconnected to the beam 45 and attached to the deck adjacent to the starboard side pontoon 3, by the coupling assembly 50. The ski units are thus located adjacent to the front of the boat and support the forward portion of the vessel raised from the underlying support surface, promoting the movement of the boat over the underlying support surface.

Each of the ski units 46 and 47 is further constructed to provide for rotatable orientation relative to the vessel for steering of the vessel.

Thus, referring again and particularly to FIGS. 9 and 10, the ski 58 is secured to a shaft 59. The shaft 59 is journaled in a tubular journal 60 welded to the underside of the outer end of the beam 45 and projected upwardly through the journal and an opening in the beam. A pivot member 61, shown as an arm, is secured to the upper end of the shaft 59 and rotatably supports the shaft 59 within the beam and journal 60 with the ski located in downwardly spaced relation to the journal. Pivoting of the arm 61 and the interconnected shaft 59 results in appropriate steering rotation of the ski 58. In the illustrated embodiment of the invention, a rod 62 is interconnected to the arms 61 and 61' of the respective ski units 46 and 47.

More particularly, a steering rod 63 is secured to rod 62 and is journaled in a journal support 64. Rod 63 extends back to the control center 7. The forward end of the rod 63 terminates and is connected to the lower end of a coupling arm 64 which projects upwardly and is secured to the rod 62. The rod 63 is rotated and in so doing pivots the arm 64 moving the rod 62 laterally with a corresponding lateral movement of the arms 61 and 61' secured to the respective ski units. This provides for appropriate rotation of the skis in unison in corresponding directions for appropriate steering of the vessel as it moves over the under surface.

The present invention is shown in the illustrated embodiment in accordance with one possible construction. The present invention however discloses the broad system for direct interconnection of a traction drive unit in combination with a spaced ground support immediately adjacent to and forming an integrated part of the vessel and configured for ready and free movement of the vessel and adapted thereby for both use during warm weather when water is available and for use during winter and other periods when water is not readily available for use other than in the form of a frozen waterway or the like. Thus, particularly during the winter months in various area, the vessel could be used rather than being stored during the winter months both for utilitarian purposes as well as recreational purposes. The traction driven vessel can be readily driven over the ice or the snow of an area. When driven over a frozen-over water body such as a lake or river, it has the additionally advantage of maintaining a safety factor. Thus, if for any reason the vessel should break through the ice, the pontoons would serve to maintain the floating state of the vessel. The vessel could thus also serve as a highly effective rescue vessel and freely driven onto an icy area to arrive at a broken portion without danger and maintain its ability to continue movement over and through the broken areas because of its floatability capabilities and the like. The unit would also be particularly adapted to ice fishing, providing a very comfortable enclosure while permitting conventional ice fishing, as well as to various ice fisherman on the ice.

In summary, the present invention is particularly directed to a detachable and integrated power propelling unit which can be affixed to a pontoon vessel to drive the unit over ice while also permitting the conventional use of the vessel for propulsion over and in a body of water or the like. Thus, although shown with a special coupling assembly for interconnection of an outboard motor for water propulsion and a traction drive unit for solid surface propulsion, any other arrangements could be provided.

Alternative forward support structures could be provided. In addition, although shown as a traction drive, any surface propulsion means could be provided including multiple tracks, wheels and the like. The illustrated traction drive is particularly considered practical in view of significant developments of snowmobiles and traction drives therefore. The central location of the traction drive to the vessel is also advantageous as a practical placement but could be otherwise placed or secured in the outboard of the assembly and in the broadest concept thee pontoon's could be removed and appropriate drive or drives attached. A significant difference is the integration of the traction drive directly into and forming a part of the vessel for ground transport.

The present invention thus provides a vehicle which can be used during the summer or warm weather for leisure, travel or servicing on lakes, rivers and the like. In addition, the vessel can be similarly used in winter or in other areas having continuous winter or cold weather, the driveability and floatability particularly adapting it to a safe usage for leisure or surface.

Various alternative and embodiments are contemplated as being within the scope of the following claims particularly pointing out and distinctly claiming the subject matter regarded as the invention.

What is claimed is:

1. A drive system for a floating vessel having laterally spaced supporting pontoons extending in substantially parallel relationship in fore and aft orientation with respect to movement of the floating vessel, said drive system providing for moving of the floating vessel on a solid supporting undersurface and comprising:
    a traction drive unit configured to engage a substantially solid supporting undersurface,
    a first coupling assembly including a first vessel coupling unit configured to be fixedly secured to said vessel and including a complementing releasable traction drive coupling unit for releasable interconnection of said traction drive unit to said first vessel coupling unit, and locating of said traction drive unit having a drive portion spaced downwardly from said releasable traction drive coupling unit and immediately adjacent to said vessel and configured to support said floating vessel in raised relationship relative to the solid supporting undersurface,
    a second coupling assembly located in spaced relation to said first coupling assembly and including a second vessel coupling unit configured to be fixedly secured to said vessel in spaced relation to said first vessel coupling unit,
    a second supporting unit including a complementing coupling unit for releasable connection to said second vessel coupling unit and configured to movably support a spaced portion of said vessel spaced from the traction drive unit on said solid supporting undersurface and thereby providing for movement on and from the water,
    said second supporting unit includes a plurality of laterally spaced ski units, a connecting structure interconnecting of said spaced ski units to each other, a plurality of second coupling assemblies for interconnection of each of said ski units to the forward portion of said pontoon vessel, each of said laterally spaced ski units including a ski member located downwardly from one of said second coupling assemblies to locate and support the pontoon floating vessel on a supporting undersurface with the pontoons spaced upwardly therefrom, and
    wherein said second coupling assemblies each including a rotational support in a substantially horizontal plane, and a steering control unit connected to said ski members for rotating said ski members and thereby controlling the directional movement of said vessel on the supporting undersurface.

2. The drive system of claim 1 wherein said second coupling assemblies include a plurality of releasable vessel coupling assemblies laterally spaced and located to support a ski unit and in alignment with the forward portion of said vessel, each of said second coupling assemblies including a forward vessel coupling unit secured to said vessel for each of said ski units and a ski coupling unit connected to the ski units and complementing the forward vessel coupling unit of an associated second coupling assembly.

3. The device of claim 2 wherein each of said forward vessel coupling unit includes a first member secured to the vessel and extending longitudinally of the vessel, each of said ski coupling units includes a second member secured to the ski unit and configured to telescopic movement into said first member of said forward vessel coupling unit, and a releasable locking unit engaging said first and second members to lock the ski unit to the pontoon vessel.

4. The drive of claim 3 wherein said connecting structure includes a supporting beam, each of said ski units including a journal secured to said beam and a shaft connected to the ski member and extending upwardly through the beam and terminating in an upper end above the beam, and a lever arm secured to said upper end of said shaft, said steering control including a member interconnecting said lever arms for simultaneous angular orientation of said skis.

5. The drive system of claim 1, wherein said first coupling assembly further includes an outboard motor drive coupling unit complementing said first vessel coupling unit and configured for releasable connection thereto in place of said releasable traction drive coupling unit, wherein said outboard motor drive coupling unit includes a transom unit configured to receive an outboard motor drive unit and thereby providing for the propulsion and movement of the floating vessel in a body of water.

6. A drive assembly for a pontoon vessel having laterally spaced supporting pontoons extending in substantially parallel relationship in fore and aft orientation with respect to movement of the floating vessel, comprising:

an aft support coupling unit adapted to be secured to the aft end of the vessel between said pontoons, a water propulsion drive unit including a water drive coupling unit for releasable interconnection with the aft support coupling unit on said pontoon vessel, and said propulsion drive unit including power means for depending downwardly of said pontoons for immersion within a body of water for propelling said pontoon vessel over the body of water, a traction drive assembly configured to engage a substantially solid supporting undersurface and including a traction coupling unit for releasable interconnection to the aft support coupling unit of the pontoon vessel, said traction drive assembly having a traction drive member spaced downwardly from said traction coupling unit for supporting of said pontoon vessel in raised relationship to a solid supporting undersurface and a forward vessel coupling unit secured to the forward portion of the vessel, a forward support having a supporting coupling unit complimentary said forward coupling unit and configured to movably support the forward end of said vessel on said solid supporting undersurface, said traction drive assembly thereby providing for use of said pontoon vessel with movement over said solid supporting undersurface, and wherein said aft coupling unit on said pontoon vessel includes laterally spaced support members, said water drive coupling unit including spaced members releasably engageable with said spaced members of said spaced members of said aft coupling unit and including an outboard motor unit as said water propulsion drive unit, and said traction coupling unit including laterally spaced members configured for releasable engagement with said laterally spaced members of said aft coupling unit for releasable engagement therewith, said traction drive assembly including an endless drive member having a bottom run defining said lower support for said pontoon vessel in the assembled relation and including an engine drive for rotating of said endless drive member.

* * * * *